United States Patent
Marocchini et al.

(10) Patent No.: US 9,410,564 B2
(45) Date of Patent: Aug. 9, 2016

(54) PNEUMATIC PORT SHIELD

(71) Applicant: Hamilton Sundstrand Corporation, Charlotte, NC (US)

(72) Inventors: Francis P. Marocchini, Somers, CT (US); Scott J. Beloncik, Westfield, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 171 days.

(21) Appl. No.: 14/320,884

(22) Filed: Jul. 1, 2014

(65) Prior Publication Data

US 2016/0003371 A1    Jan. 7, 2016

(51) Int. Cl.
| | | |
|---|---|---|
| *F16K 27/12* | (2006.01) | |
| *F15B 21/04* | (2006.01) | |
| *F15B 15/14* | (2006.01) | |
| *F16K 24/00* | (2006.01) | |
| *F16K 35/10* | (2006.01) | |
| *F15B 15/06* | (2006.01) | |

(52) U.S. Cl.
CPC ........... *F15B 21/041* (2013.01); *F15B 15/1423* (2013.01); *F16K 24/00* (2013.01); *F16K 27/12* (2013.01); *F16K 35/10* (2013.01); *F15B 15/06* (2013.01); *F15B 2211/615* (2013.01); *Y10T 137/6851* (2015.04); *Y10T 137/7043* (2015.04); *Y10T 137/7062* (2015.04)

(58) Field of Classification Search
CPC .............. F16K 27/12; Y10T 137/7043; Y10T 137/7062; Y10T 137/6851; F15B 15/1423; F15B 15/149; F15B 21/041; F15B 2211/615
USPC ...................................... 137/377; 92/8, 169.1
See application file for complete search history.

(56) References Cited

U.S. PATENT DOCUMENTS

| | | | | |
|---|---|---|---|---|
| 2,028,756 | A * | 1/1936 | Crecca .................. | F16K 17/196 137/382 |
| 2,985,374 | A * | 5/1961 | Jensen .................. | G05D 23/185 137/85 |
| 4,337,691 | A | 7/1982 | Tomaru | |
| 4,756,233 | A * | 7/1988 | Takahashi ............. | F15B 21/041 137/550 |
| 4,930,403 | A * | 6/1990 | Husted ................ | F15B 13/0402 91/443 |

FOREIGN PATENT DOCUMENTS

| | | |
|---|---|---|
| DE | 19935629 A1 | 2/2001 |
| DE | 202004011911 U1 | 1/2005 |
| EP | 0762024 A2 | 12/1997 |
| EP | 2377593 A1 | 10/2011 |

OTHER PUBLICATIONS

The European Search Report mailed Nov. 10, 2015 for Application No. 15174755.7.

* cited by examiner

*Primary Examiner* — Kevin Murphy
*Assistant Examiner* — Richard K Durden
(74) *Attorney, Agent, or Firm* — Kinney & Lange, P.A.

(57) ABSTRACT

A port shield for a pneumatic actuator with a casing wall includes a sheet and a connecting member. The sheet includes an outer face disposed opposite an inner face, a first end disposed opposite a second end, and a first edge disposed opposite a second edge. The sheet also includes a bend formed in the sheet between the first edge and the second edge, wherein the bend extends from the first end to the second end and forms an apex on the outer face of the sheet. The connecting member extends from the sheet and is configured to connect the sheet to an outer side of the casing wall of the pneumatic actuator.

14 Claims, 4 Drawing Sheets

PNEUMATIC PORT SHIELD

BACKGROUND

The present disclosure relates to pneumatic air valves and pneumatic air actuators. More particularly, this invention relates to ambient ports on pneumatic air valves and pneumatic air actuators.

Pneumatic air valves and actuators have long been used in aerospace applications, such as engine air starters in helicopters, due to a light weight, efficient packaging capability, and the ability to operate over a large temperature variation. Pneumatic air valves and actuators are designed to work against a reference pressure, the reference pressure generally being set at ambient pressure. Ambient ports are formed in the casing of pneumatic air valves and actuators to supply ambient air pressure to the reference sides of pneumatic air valves or actuators. Historically, pneumatic air valves and actuators have not incorporated filtration of the ambient ports.

As aerospace applications advance, so have the performance requirements of pneumatic air valves and actuators. Performance accuracy of pneumatic air valves and actuators depends upon tight control tolerances and small mechanical clearances. New applications have produced more challenging operating environments that expose the pneumatic air valves and actuators to increased external air contamination. Testing has revealed that unfiltered ambient ports allow ingestion of particles when the pneumatic air valves and actuators are subjected to external particles being driven at the unit. The ingested particles affect the performance of the pneumatic air valves and actuators by clogging the small mechanical clearances present in the pneumatic air valves and actuators. Though the use of filters on the ambient ports would prevent the ingestion of particles into the pneumatic air valves and actuators through the ambient ports, filters constrict the air flow through the ambient ports, impacting the reference pressure of the pneumatic air valves and actuators which impacts their performance. In addition, due to the amount of potential contaminate to which each pneumatic air valve unit is subjected, incorporating filtration is not considered a reasonable solution.

SUMMARY

In one aspect of the invention, a port shield for a pneumatic actuator with a casing wall includes a sheet and a connecting member. The sheet includes an outer face disposed opposite an inner face, a first end disposed opposite a second end, and a first edge disposed opposite a second edge. The sheet also includes a bend formed in the sheet between the first edge and the second edge, wherein the bend extends from the first end to the second end and forms an apex on the outer face of the sheet. The connecting member extends from the sheet and is configured to connect the sheet to an outer side of the casing wall of the pneumatic actuator.

In another aspect of the invention, a pneumatic actuator includes a casing wall with an inner side and an outer side. An air port extends through the inner and outer sides of the casing wall. A port shield includes a sheet disposed on the outer side of the casing wall and over the air port. The sheet includes a first end disposed opposite a second end and a first edge disposed opposite a second edge. The sheet also includes a bend formed in the sheet between the first edge and the second edge. The bend extends from the first end to the second end and creates a fluid passage between the outer side of the casing wall and the sheet and over the air port. The port shield also includes a connecting member that extends from the sheet and is configured to connect the sheet to the outer side of the casing wall such that the bend in the sheet is disposed proximate the air port.

Persons of ordinary skill in the art will recognize that other aspects and embodiments of the present invention are possible in view of the entirety of the present disclosure, including the accompanying figures.

Figure 1:
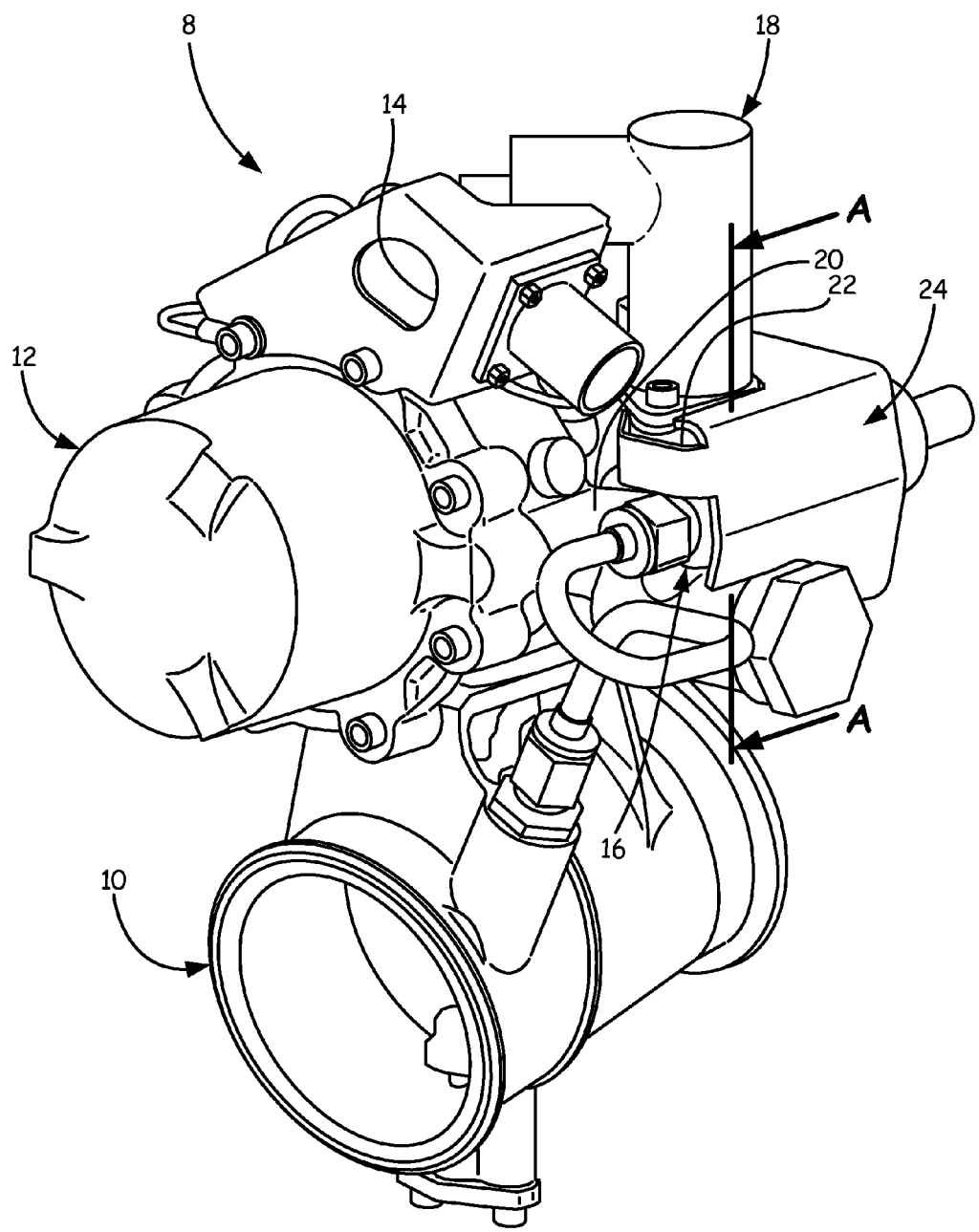
FIG. 1 is a perspective view of a port shield disposed on a pneumatic butterfly valve and actuator piston assembly.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings. Like reference numerals identify similar structural elements.

DETAILED DESCRIPTION

The present invention provides a port shield for protecting an ambient port of a pneumatic actuator from the ingestion of particle contaminants without constricting the airflow across the ambient port. The port shield protects the ambient port from particles by creating a tortuous air pathway into the ambient port. The port shield contains relatively few parts making it simple to assemble and giving it a low profile.

FIG. 1 is a perspective view of pneumatic actuator 8. As shown in FIG. 1, pneumatic actuator 8 can be a pneumatic butterfly valve assembly comprising butterfly valve 10, actuator piston 12, drive shaft 14, pressure regulator 16, solenoid 18, casing wall 20, and mounting boss 22. Actuator piston 12 is connected to butterfly valve 10 via drive shaft 14. Casing wall 20 provides ambient port 28 passage to a reference side of actuator piston 12 and houses pressure regulator 16. Mounting boss 22 extends from a portion of the casing wall 20 housing regulator 16 and solenoid 18 is bolted to or screwed to mounting boss 22. Port shield 24 can be secured to casing wall 20 by wrapping around the pressure regulator 16. Ambient port 28, not visible in FIG. 1 but shown in FIG. 3, is an air port formed in casing wall 20 and through which air can exit regulator 16 to atmosphere, and/or through which air can enter pressure regulator 16 from atmosphere. As discussed below in FIGS. 2A-3, port shield 24 is connected to casing wall 20 and covers ambient port 28 to prevent pneumatic actuator 8 from ingesting outside particles through ambient port 24 without inhibiting airflow across ambient port 28.

Figure 2A:
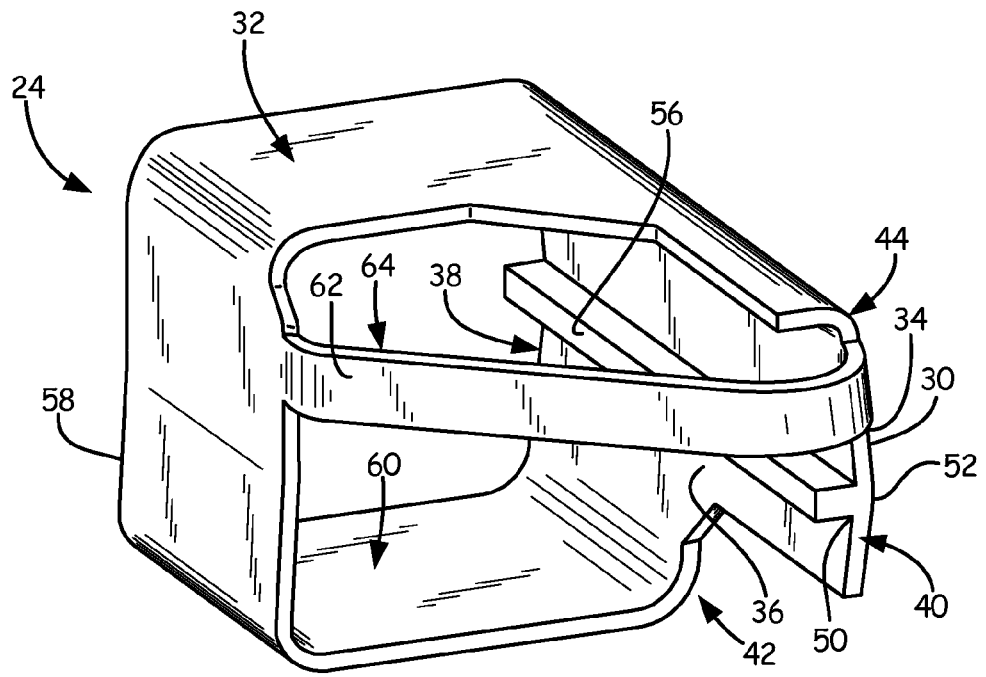
FIG. 2A is a perspective view of the port shield of FIG. 1.
Figure 2B:
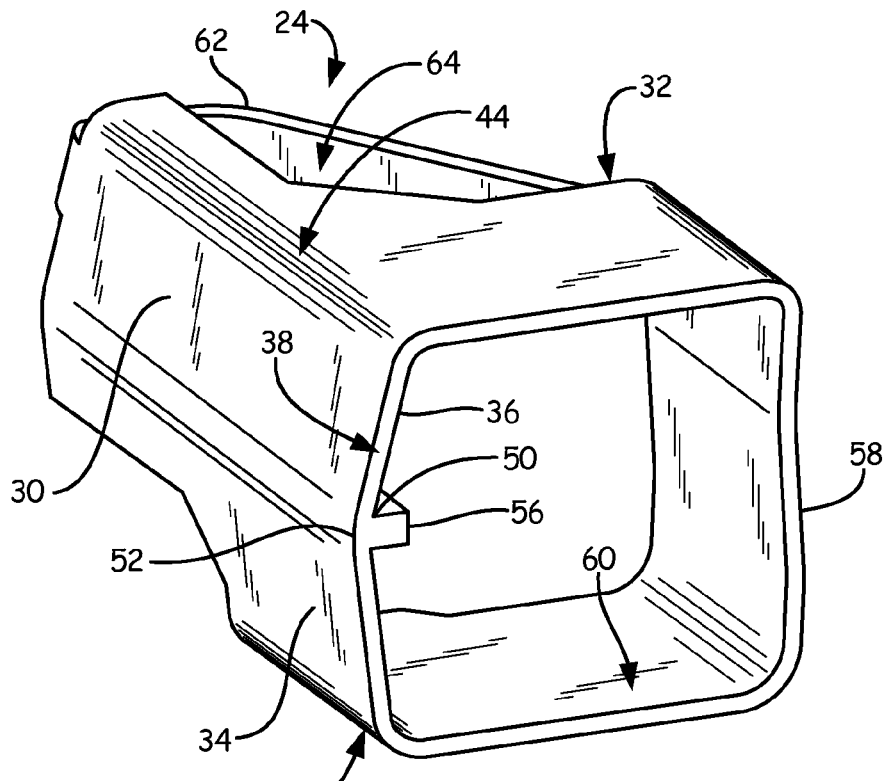
FIG. 2B is a perspective view of the port shield of FIG. 2A rotated 180 degrees.
Figure 3:
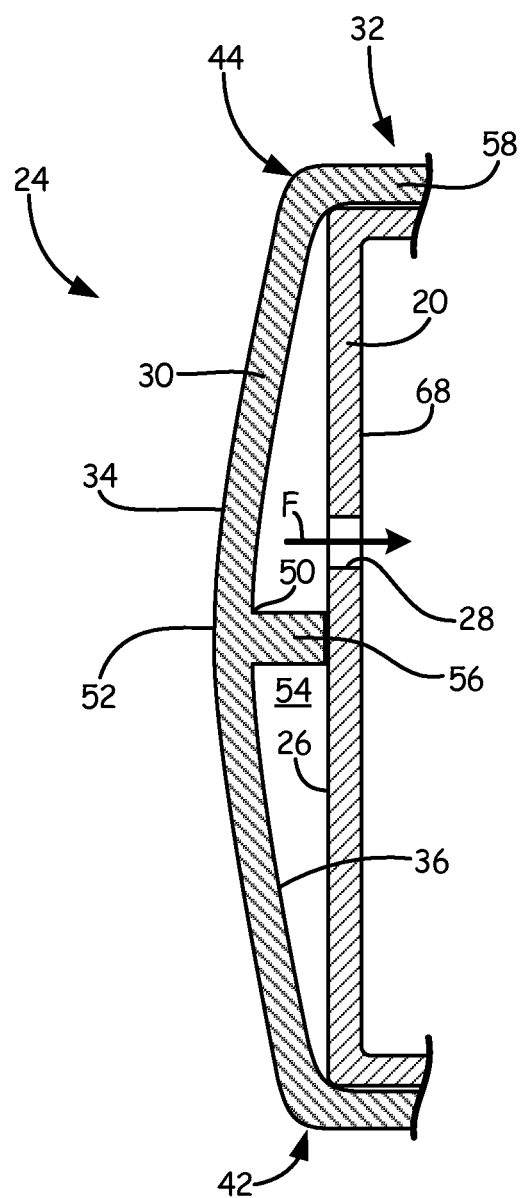
FIG. 3 is a cross-sectional view of the port shield disposed over an ambient air port of the pneumatic butterfly valve and actuator piston assembly of FIG. 1 taken along line A-A.

FIGS. 2A-2B will be discussed concurrently. FIG. 2A is a perspective view of the port shield 24 of FIG. 1, and FIG. 2B is a perspective view of port shield 24 of FIG. 2A rotated 180 degrees. As shown in FIGS. 2A-2B, port shield 24 includes sheet 30 and connecting member 32. Sheet 30 can include outer face 34, inner face 36, first end 38, second end 40, first edge 42, second edge 44, bend 50, apex 52, and standoff element 56. Connecting member 32 can include first strap 58 forming first loop 60, and second strap 62 forming second loop 64.

Outer face 34 of sheet 30 is disposed opposite inner face 36 of sheet 30. First end 38 of sheet 30 is disposed opposite second end 40 of sheet 30. First edge 42 of sheet 30 is disposed opposite second edge 40 of sheet 30. Both first edge 42 and second edge 40 of sheet 30 are generally parallel to one another and are both generally perpendicular to first end 38 and second end 40 of sheet 30. Bend 50 can be formed in sheet 30 between first edge 42 and second edge 44 and can extend from first end 38 to second end 40 of sheet 30. Bend 50 forms apex 52 on outer face 34 of sheet 30. Standoff element 56 can extend traversely from inner face 36 of sheet 30 proximate bend 50. Standoff element 56 can extend generally parallel to sheet 30 from first end 38 to second end 40 of sheet 30.

First strap 58 can extend from first edge 42 of sheet 30 and connect to second edge 44 of sheet 30 to form first loop 60 proximate first end 38 of sheet 30. Second strap 62 can extend from second end 40 of sheet 30 and connect to first strap 58 to form second loop 64. As discussed below with reference to FIG. 3, first strap 58 and second strap 62 of connecting member 32 are configured to connect sheet 30 to outer side 26 of casing wall 20 such that bend 50 in sheet 30 is disposed proximate ambient port 28.

FIG. 3 is a cross-sectional view of port shield 24 disposed over ambient port 28 formed in casing wall 20 of pneumatic actuator 8 of FIG. 1 taken along line A-A. Ambient port 28 extends through inner side 68 and outer side 26 of casing wall 20 and allows airflow F to enter and exit casing wall 20. Casing wall 20 includes outer side 26, ambient port 28, and inner side 68. To connect port shield 24 to pneumatic actuator 8, first strap 58 of connecting member 32 of port shield 30 can be disposed at least partially around casing wall 20 and regulator 16 and second strap 62 of connecting member 32 of port shield 30 can be disposed around mounting boss 22. Once attached to pneumatic actuator 8, inner face 36 of sheet 30 faces outer side 26 of casing wall 20. Bend 50 is disposed over ambient port 28 and standoff element 56 extends from inner face 36 of sheet 30 towards outer side 26 of casing wall 20. Standoff element 56 contacts outer side 26 of casing wall 20 and prevents inner face 36 of sheet 30 from lying completely flush against outer side 26 of casing wall 20 and blocking ambient port 28 from air flow F. Together, bend 50 and standoff element 56 create fluid passage 54 between outer side 26 of casing wall 20 and inner face 36 of sheet 30. Fluid passage 54 is disposed over ambient port 28, is transverse with ambient port 28, and is in fluidic communication with ambient port 28. Fluid passage 54 can extend from first end 38 of sheet 30 to second end 40 of sheet 30 and can be open to atmosphere at both first end 38 and second end 40 of sheet 30.

During operation, airflow F that enters ambient port 28 from atmosphere must first travel in fluid passage 54 between outerside 26 of casing wall 20 and inner face 36 of sheet 30. Once airflow F has reached ambient port 28, airflow F must turn approximately 90 degrees before it can enter ambient port 28. As airflow F turns, the momentum of particles carried in the airflow F decreases and the particles continue to fall through fluid passage 54 and exit fluid passage 54 at first end 38 or second end 40 of sheet 30.

Sheet 30, connecting member 32, and standoff element 56 can be integral and formed from a compliant and lightweight material, such as rubber or fiberglass fabric. In the embodiment of FIGS. 2A-3, port shield 24 is formed from molded rubber. Because port shield 24 is compliant, standoff element 56 can form bend 50 in sheet 30 as standoff element 56 is pressed against outer side 26 of casing wall 20 during installation of port shield 24 to pneumatic actuator 8. Because standoff element 56 can form bend 50 during installation, bend 50 does not have to be preformed in sheet 30 during the manufacture of port shield 24. Because port shield 24 is compliant, first strap 58 and second strap 62 can be stretched as port shield 24 is assembled onto pneumatic actuator 8 such that first strap 58 and second strap 63 do not require a fastener. While first strap 58 and second strap 63 do not require fasteners to connect port shield 24 to pneumatic actuator 8, first strap 58 and/or second strap 63 can include fastener 66, as discussed below with reference to FIGS. 4A and 4B.

Figure 4A:
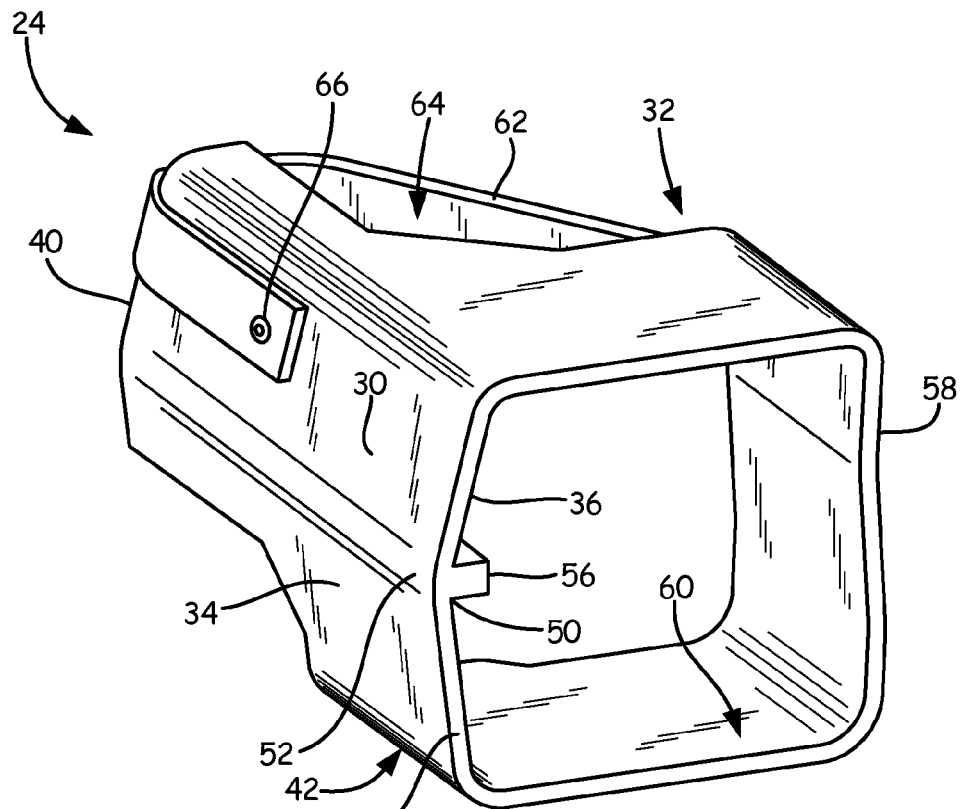
FIG. 4A is a perspective view of another embodiment of the port shield.
Figure 4B:
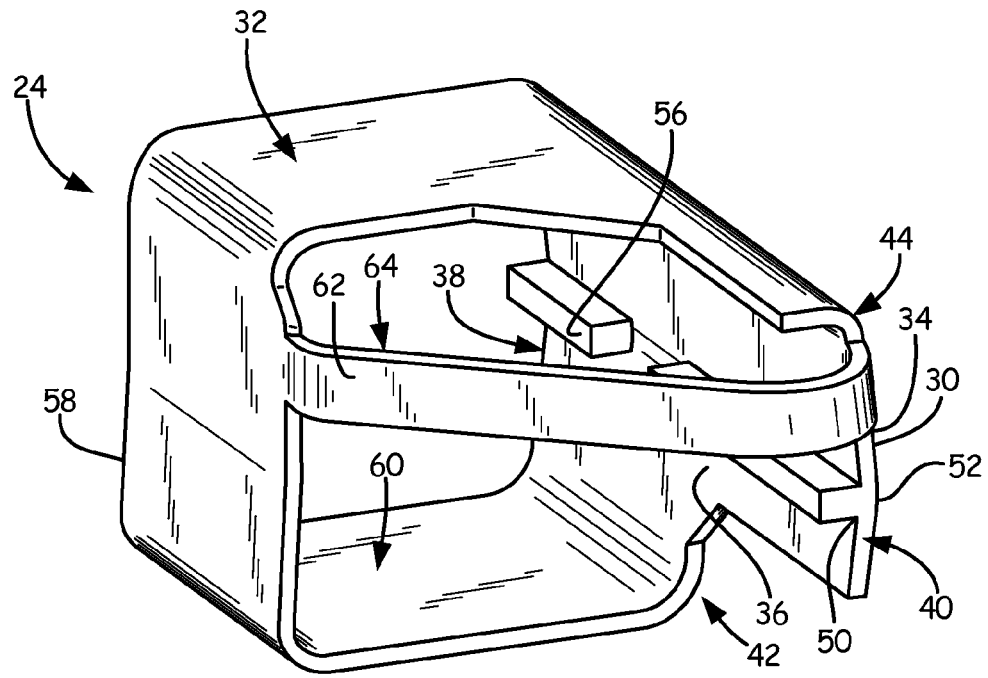
FIG. 4B is a perspective view of the port shield of FIG. 4A rotated 180 degrees.

FIGS. 4A and 4B are perspective views of another embodiment of port shield 24 that includes fastener 66. Fastener 66 can be disposed on second end 40 of sheet 30 and second strap 62 and can releasably connect second strap 62 to second end 40 of sheet 30. The term "releasably connect" can be defined as being able to connect, disconnect, and reconnect. Fastener 66 can be selected from the group consisting of hook-and-loop fasteners, snap fasteners, buckles, buttons, hook-and-eye closures, ties, rivets, threaded fasteners, or combinations therein. As shown in FIG. 4B, standoff element 56 can include at least one gap so as to reduce the overall weight of port shield 24.

In view of the foregoing description, it will be recognized that the present disclosure provides numerous advantages and benefits. For example, the present disclosure provides port shield 24. As a single piece component, port shield 24 maintains a low profile and is easy to reliably install. Furthermore, port shield 24 effectively shields ambient port 28 from particle ingestion without constricting the air flow rate across the ambient port 28. Port shield 24 can also be used on already existing ports and does not require any changes or redesigns on pneumatic actuators or valves and their ports. Port shield 24 is compliant and flexible, which simplifies the installation process. Port shield 24 is also lightweight and relatively inexpensive to manufacture.

The following are non-exclusive descriptions of possible embodiments of the present invention.

In one embodiment, a port shield for a pneumatic actuator with a casing wall includes a sheet and a connecting member. The sheet includes an outer face disposed opposite an inner face, a first end disposed opposite a second end, and a first edge disposed opposite a second edge. The sheet also includes a bend formed in the sheet between the first edge and the second edge, wherein the bend extends from the first end to the second end and forms an apex on the outer face of the sheet. The connecting member extends from the sheet and is configured to connect the sheet to an outer side of the casing wall of the pneumatic actuator.

The port shield of the preceding paragraph can optionally include, additionally and/or alternatively, any one or more of the following features, configurations and/or additional components:

the sheet further comprises: a standoff element extending from the inner face of the sheet proximate the bend;

the sheet, the connecting member, and the standoff element comprise a compliant material; and/or the sheet, the connecting member, and the standoff element comprise a material selected from the group consisting of rubber and fiberglass fabric.

In another embodiment, a pneumatic actuator includes a casing wall with an inner side and an outer side. An air port extends through the inner and outer sides of the casing wall. A port shield includes a sheet disposed on the outer side of the casing wall and over the air port. The sheet includes a first end disposed opposite a second end and a first edge disposed opposite a second edge. The sheet also includes a bend formed in the sheet between the first edge and the second edge. The bend extends from the first end to the second end and creates a fluid passage between the outer side of the casing wall and the sheet and over the air port. The port shield also includes a connecting member that extends from the sheet and is configured to connect the sheet to the outer side of the casing wall such that the bend in the sheet is disposed proximate the air port.

The pneumatic actuator of the preceding paragraph can optionally include, additionally and/or alternatively, any one or more of the following features, configurations and/or additional components:

the sheet further comprises: an inner face disposed opposite an outer face, wherein the inner face faces the outer side of the casing wall; and a standoff element extending from the inner face of the sheet proximate the bend, and wherein the standoff element contacts the outer side of the casing wall;

the standoff element extends from the first end of the sheet to the second end of the sheet;

the fluid passage disposed between the outer side of the casing wall and the sheet, and extends from the first end of the sheet to the second end of the sheet;

the fluid passage is open to atmosphere at the first end of the sheet;

the fluid passage is open to atmosphere at the second end of the sheet;

the connecting member comprises: a first strap extending from the first edge of the sheet and connecting to the second edge of the sheet to form a first loop proximate the first end of the sheet;

the connecting member further comprises: a second strap extending from the second end of the sheet and connecting to the first strap to form a second loop;

the connecting member further comprises: a fastener connecting the second strap to the second end of the sheet;

the pneumatic actuator further comprises: a mounting boss extending from a portion of the casing wall and configured to mount a solenoid to the casing wall, wherein the second strap of the connecting member of the port shield is disposed around the mounting boss; and/or the pneumatic actuator further comprises: a regulator housed within the casing wall, wherein the first strap of the connecting member of the port shield is disposed at least partially around the casing wall and the regulator.

Any relative terms or terms of degree used herein, such as "substantially", "essentially", "generally" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transitory vibrations and sway movements, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. For example, while the specification describes port shield 24 as having first strap 58 and second strap 62, port shield 24 can have additional straps depending on the application. Furthermore, while the invention has been described in reference to pneumatic actuators and valves, the invention may be used in any application where a pressure port may require shielding from particle ingestion. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A port shield for a pneumatic actuator having a casing wall, the port shield comprising:
   a sheet comprising:
      an outer face disposed opposite an inner face;
      a first end disposed opposite a second end;
      a first edge disposed opposite a second edge; and
      a bend formed in the sheet between the first edge and the second edge, wherein the bend extends from the first end to the second end and forms an apex on the outer face of the sheet; and
   a connecting member extending from the sheet and configured to connect the sheet to an outer side of the casing wall of the pneumatic actuator,
   wherein the connecting member comprises a first strap extending from the first edge of the sheet and connecting to the second edge of the sheet to form a first loop proximate the first end of the sheet.

2. The port shield of claim 1, wherein the sheet further comprises:
   a standoff element extending from the inner face of the sheet proximate the bend.

3. The port shield of claim 2, wherein the sheet, the connecting member, and the standoff element comprise a compliant material.

4. The port shield of claim 2, wherein the sheet, the connecting member, and the standoff element comprise a material selected from the group consisting of rubber and fiberglass fabric.

5. A pneumatic actuator comprising:
   a casing wall with an inner side and an outer side;
   an air port extending through the inner and outer sides of the casing wall; and
   a port shield comprising:
      a sheet disposed on the outer side of the casing wall and over the air port, the sheet comprising:
         a first end disposed opposite a second end;
         a first edge disposed opposite a second edge; and
         a bend formed in the sheet between the first edge and the second edge, wherein the bend extends from the first end to the second end and creates a fluid passage between the outer side of the casing wall and the sheet and over the air port; and
      a connecting member extending from the sheet and configured to connect the sheet to the outer side of the casing wall such that the bend in the sheet is disposed proximate the air port,
      wherein the connecting member comprises a first strap extending from the first edge of the sheet and connecting to the second edge of the sheet to form a first loop proximate the first end of the sheet.

6. The pneumatic actuator of claim 5, wherein the sheet further comprises:
   an inner face disposed opposite an outer face, wherein the inner face faces the outer side of the casing wall; and a standoff element extending from the inner face of the sheet proximate the bend, and wherein the standoff element contacts the outer side of the casing wall.

7. The pneumatic actuator of claim 6, wherein the standoff element extends from the first end of the sheet to the second end of the sheet.

8. The pneumatic actuator of claim 5, wherein the fluid passage is disposed between the outer side of the casing wall and the sheet, and extends from the first end of the sheet to the second end of the sheet.

9. The pneumatic actuator of claim 8, wherein the fluid passage is open to atmosphere at the first end of the sheet.

10. The pneumatic actuator of claim 9, wherein the fluid passage is open to atmosphere at the second end of the sheet.

11. The pneumatic actuator of claim 5, wherein the connecting member further comprises:
a second strap extending from the second end of the sheet and connecting to the first strap to form a second loop.

12. The pneumatic actuator of claim 11, wherein the connecting member further comprises:
a fastener connecting the second strap to the second end of the sheet.

13. The pneumatic actuator of claim 11, wherein the pneumatic actuator further comprises:
a mounting boss extending from a portion of the casing wall and configured to mount a solenoid to the casing wall,
wherein the second strap of the connecting member of the port shield is disposed around the mounting boss.

14. The pneumatic actuator of claim 13, wherein the pneumatic actuator further comprises:
a regulator housed within the casing wall,
wherein the first strap of the connecting member of the port shield is disposed at least partially around the casing wall and the regulator.

* * * * *